(12) United States Patent
Bushko et al.

(10) Patent No.: US 7,962,261 B2
(45) Date of Patent: Jun. 14, 2011

(54) VEHICLE SUSPENSION

(75) Inventors: Dariusz Antoni Bushko, Hopkinton, MA (US); Upendra V. Ummethala, Northborough, MA (US); Steven N. Brown, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 319 days.

(21) Appl. No.: 11/938,663

(22) Filed: Nov. 12, 2007

(65) Prior Publication Data
US 2009/0121444 A1   May 14, 2009

(51) Int. Cl.
*B60G 17/018* (2006.01)
(52) U.S. Cl. .................... 701/37; 701/38; 280/5.507
(58) Field of Classification Search .............. 701/36, 701/37, 38; 280/5.5, 5.507, 5.514, 5.513, 280/5.515, 6.157
See application file for complete search history.

(56) References Cited

U.S. PATENT DOCUMENTS

| | | |
|---|---|---|
| 2,964,272 A | 12/1960 | Olson |
| 3,584,893 A | 6/1971 | Tuczek et al. |
| 3,606,233 A | 9/1971 | Scharton |
| 3,701,499 A | 10/1972 | Schubert et al. |
| 3,703,999 A | 11/1972 | Forys et al. |
| 3,807,678 A | 4/1974 | Karnopp et al. |
| 3,842,753 A | 10/1974 | Theodore et al. |
| 3,990,668 A | 11/1976 | Thompson et al. |
| 4,083,433 A | 4/1978 | Geohegan, Jr. et al. |
| 4,198,025 A | 4/1980 | Lowe et al. |
| 4,314,327 A | 2/1982 | DePuy |
| 4,363,377 A | 12/1982 | Van Gerpen |
| 4,397,440 A | 8/1983 | Hall et al. |
| 4,526,401 A | 7/1985 | Kakizaki et al. |
| 4,531,699 A | 7/1985 | Pinson |
| 4,566,993 A | 1/1986 | Secemski et al. |
| 4,796,873 A | 1/1989 | Schubert |
| 4,815,575 A | 3/1989 | Murty |
| 4,828,230 A | 5/1989 | Steger et al. |
| 4,977,631 A | 12/1990 | Bretz |
| 4,981,309 A | 1/1991 | Froeschle et al. |
| 5,044,662 A | 9/1991 | Kawabata |
| 5,060,959 A | 10/1991 | Davis et al. |
| 5,070,284 A | 12/1991 | Patil et al. |
| 5,091,679 A | 2/1992 | Murty et al. |
| 5,133,527 A | 7/1992 | Chen et al. |
| 5,144,559 A | 9/1992 | Kamimura et al. |
| 5,296,786 A | 3/1994 | Habisohn et al. |
| 5,309,861 A | 5/1994 | Mardikian |
| 5,313,399 A | 5/1994 | Beale |

(Continued)

FOREIGN PATENT DOCUMENTS

DE    1955410    6/1979

(Continued)

OTHER PUBLICATIONS

International Search Report and Written Opinion dated Feb. 6, 2009, issued in International Application No. PCT/US2008/082434, filed Nov. 5, 2008.

(Continued)

*Primary Examiner* — Gertrude Arthur Jeanglaud

(57) ABSTRACT

There is provided a vehicle suspension. More specifically, in one or more embodiments, there is provided an apparatus including an actuator system having a combination of actuators including a linear electromagnetic actuator and a rotary electromagnetic actuator, wherein the actuator system provides force between the sprung mass and an unsprung mass of a vehicle.

23 Claims, 7 Drawing Sheets

U.S. PATENT DOCUMENTS

| | | | |
|---|---|---|---|
| 5,322,321 A | 6/1994 | Yopp | |
| 5,346,242 A | 9/1994 | Karnopp | |
| 5,350,983 A | 9/1994 | Miller et al. | |
| 5,371,754 A | 12/1994 | Berndt et al. | |
| 5,427,347 A | 6/1995 | Swanson et al. | |
| 5,536,059 A | 7/1996 | Amirouche | |
| 5,551,650 A | 9/1996 | Southward et al. | |
| 5,555,501 A | 9/1996 | Furihata et al. | |
| 5,564,520 A | 10/1996 | Forsythe | |
| 5,570,866 A | 11/1996 | Stephens | |
| 5,574,445 A | 11/1996 | Maresca et al. | |
| 5,582,385 A | 12/1996 | Boyle et al. | |
| 5,603,387 A | 2/1997 | Beard et al. | |
| 5,628,499 A | 5/1997 | Ikeda et al. | |
| 5,801,462 A | 9/1998 | Yagoto et al. | |
| 5,810,125 A | 9/1998 | Gezari | |
| 5,908,456 A | 6/1999 | Wahlers | |
| 5,918,564 A | 7/1999 | Ohtsuka et al. | |
| 5,931,533 A | 8/1999 | Lance | |
| 5,944,131 A | 8/1999 | Schaffner et al. | |
| 5,975,508 A | 11/1999 | Beard | |
| 5,999,868 A * | 12/1999 | Beno et al. | 701/37 |
| 6,032,770 A | 3/2000 | Alcone et al. | |
| 6,036,102 A | 3/2000 | Pearson | |
| 6,059,253 A | 5/2000 | Koutsky et al. | |
| 6,070,681 A | 6/2000 | Catanzarite et al. | |
| 6,179,070 B1 | 1/2001 | Dietzen | |
| 6,231,067 B1 | 5/2001 | Johnson et al. | |
| 6,239,566 B1 | 5/2001 | Tareilus et al. | |
| 6,264,163 B1 | 7/2001 | Ivarsson | |
| 6,286,819 B1 | 9/2001 | Ritchie et al. | |
| 6,371,456 B1 | 4/2002 | Ritchie et al. | |
| 6,371,459 B1 | 4/2002 | Schick et al. | |
| 6,386,635 B1 | 5/2002 | Ralph | |
| 6,420,996 B1 | 7/2002 | Stopczynski et al. | |
| 6,450,581 B1 | 9/2002 | Koerlin | |
| 6,460,803 B1 | 10/2002 | Kiss et al. | |
| 6,511,035 B1 | 1/2003 | Teel et al. | |
| 6,590,639 B1 | 7/2003 | Yuan et al. | |
| 6,625,517 B1 | 9/2003 | Bogdanov et al. | |
| 6,631,526 B1 | 10/2003 | Enright | |
| 6,637,816 B2 | 10/2003 | Pavlov et al. | |
| 6,644,590 B2 | 11/2003 | Terpay et al. | |
| 6,683,543 B1 | 1/2004 | Yeo | |
| 6,719,258 B2 | 4/2004 | Bryngelson et al. | |
| 6,886,650 B2 | 5/2005 | Bremner | |
| 6,920,951 B2 | 7/2005 | Song et al. | |
| 6,942,202 B2 | 9/2005 | Kienholz | |
| 6,945,541 B2 * | 9/2005 | Brown | 280/5.507 |
| 6,959,795 B2 | 11/2005 | Kienholz | |
| 7,039,512 B2 | 5/2006 | Swinbanks et al. | |
| 7,068,178 B2 | 6/2006 | Oh | |
| 7,087,342 B2 | 8/2006 | Song et al. | |
| 7,116,100 B1 | 10/2006 | Mock et al. | |
| 7,229,133 B2 | 6/2007 | Maddelein et al. | |
| 7,234,575 B2 | 6/2007 | Anderfaas et al. | |
| 2001/0011613 A1 | 8/2001 | Schaffner et al. | |
| 2002/0088678 A1 | 7/2002 | Ruckman et al. | |
| 2003/0075967 A1 | 4/2003 | Ciolfe et al. | |
| 2004/0089488 A1 | 5/2004 | Bremner | |
| 2005/0052150 A1 | 3/2005 | Bender | |
| 2005/0278094 A1 | 12/2005 | Swinbanks et al. | |
| 2006/0095180 A1 | 5/2006 | Ummethala et al. | |
| 2006/0200287 A1 | 9/2006 | Parison et al. | |
| 2006/0237885 A1 | 10/2006 | Paillard et al. | |
| 2006/0261647 A1 | 11/2006 | Maas et al. | |
| 2008/0051958 A1 | 2/2008 | Pelchen et al. | |
| 2008/0297074 A1 * | 12/2008 | Sheahen et al. | 318/115 |

FOREIGN PATENT DOCUMENTS

| | | |
|---|---|---|
| DE | 19955410 | 5/2001 |
| DE | 10215490 A1 | 9/2003 |
| EP | 0010387 A1 | 4/1980 |
| EP | 0412853 A2 | 2/1991 |
| EP | 0415780 A1 | 3/1991 |
| EP | 0436870 A2 | 7/1991 |
| EP | 0495565 A2 | 7/1992 |
| EP | 0555266 A1 | 8/1993 |
| EP | 0585774 A2 | 3/1994 |
| EP | 1170169 A1 | 1/2002 |
| EP | 1445131 | 8/2004 |
| EP | 1512559 A2 | 3/2005 |
| EP | 1577151 A2 | 9/2005 |
| EP | 1577155 A2 | 9/2005 |
| EP | 1577156 A2 | 9/2005 |
| EP | 1607251 A1 | 12/2005 |
| GB | 2313214 A | 11/1997 |
| JP | 10086621 A | 4/1998 |
| JP | 10246273 A | 9/1998 |
| JP | 10292847 A | 11/1998 |
| JP | 2003287082 A | 10/2003 |
| WO | 0223062 A1 | 3/2002 |
| WO | 02/087909 | 11/2002 |
| WO | 03075715 A2 | 9/2003 |
| WO | 2004021330 A1 | 3/2004 |
| WO | 2004052678 A1 | 6/2004 |
| WO | 2005017386 A2 | 2/2005 |
| WO | 2006/056374 | 6/2006 |
| WO | 2006134417 A1 | 12/2006 |

OTHER PUBLICATIONS

Gilsdorf, H., et al., Electro-mechanically Actuated Systems for Roll and Body Control, Antriebs-und Fahrwerktechnik, ZF Sachs AG, 2006.

International Preliminary Report on Patentability dated Mar. 3, 2010 for PCT/US2008/082434.

EP Office Action dated Jun. 23, 2008 for Appl. No. 07101543.2.

EP Extended Search Report dated Mar. 6, 2006 for Appl. No. 05109550.3-2424.

Bratland et al, "Linear Position Sensing Using Mangetoresistive Sensors", [online] Retreived from the Internet:<URL: http://www.ssec.honeywell.com/magnetic/datasheets/linearpositionsensing.pdf>,[retrieved on Jul. 29, 2008].

EP Office Action dated Dec. 21, 2007 for Appl. No. 07101543.2-2424.

EP Extended Search Report dated Apr. 23, 2007 for Appl. No. 07101543.2-2424.

EP Office Action dated Mar. 2, 2009 for Appl. No. 07101543.2-2424.

CN Office Action dated Apr. 24, 2009 for Appl. No. 200510118494.4.

European Search Report for counterpart European Application No. 01707215.1-2424/1852302 dated Feb. 3, 2010, 8 pages.

Chinese Second Office Action for counterpart Application No. 200510118494.4 dated Jan. 29, 2010, 18 pages.

Chinese First Office Action for counterpart Application No. 200710102263.3 dated Feb. 24, 2010, 62 pages.

* cited by examiner

VEHICLE SUSPENSION

BACKGROUND

This disclosure relates to vehicle suspension.

In active suspension systems, a controlled force is introduced between the mass of the vehicle (the "sprung mass") and the mass of the wheel assemblies (the "unsprung mass"). One proposed active suspension system that employs electromagnetic motors is shown in U.S. Pat. No. 6,945,541, which is incorporated here by reference.

SUMMARY

There is provided a vehicle suspension. More specifically, in one or more embodiments, there is provided an apparatus including an actuator system having a combination of actuators including a linear electromagnetic actuator and a rotary electromagnetic actuator, wherein the actuator system provides force between the sprung mass and an unsprung mass of a vehicle.

In some aspects, the rotary electromagnetic actuator is configured as a position source. In some examples, a position command may also be provided to the rotary actuator that is a function of the relative power efficiency of the combination of actuators. In other examples, a position command may be provided to the rotary actuator that is a function of a low pass filtered version of the suspension displacement of the vehicle.

In some embodiments, the apparatus further includes an actuator system, for providing force commands to the actuator system. In one example, the actuator system apportions force commands among the combination of actuators based on a first set of parameters when the vehicle is operating under a first set of operating conditions, and apportions force among the combination of actuators based on a second set of parameters when the vehicle is operating under a second set of operating conditions.

In some examples, the actuator system apportions force commands among the combination of actuators as a function of frequency. In some, the actuator system provides lower frequency force commands to the rotary actuator, and higher frequency force commands to the linear actuator. The frequency range of force commands provided to at least two of the combination of actuators may have a degree of overlap in frequency.

The actuator system may also provide force commands with frequency components below a crossover frequency to a first actuator and force commands with frequency components above a crossover frequency to a second actuator. This crossover frequency can vary based on operating conditions of the vehicle. In some example, the crossover frequency is in the range of 1 to 2 Hz.

In some examples, the apparatus is configured to apportion force commands among the combination of actuators based on parameters associated with physical components of the system. In other examples, the apparatus is configured to apportion force commands among the actuators based on parameters associated with operation of the vehicle. In one example, the first actuator is a rotary actuator and the second actuator is a linear actuator.

In some aspects, the actuator system further includes a pneumatic actuator. In some embodiments, the rotary actuator acts through a spring. In various aspects, the spring may include a torsion spring, or the spring may be divided into two sections and the rotary actuator is connected to a common point between the first and second sections. In some examples, at least one of the combination of actuators is coupled to multiple unsprung masses. In one example, of this at least one actuator includes a rotary actuator.

In another aspect, there is a method including apportioning forces provided between a sprung and an unsprung masses of a vehicle by first and second electromagnetic actuators based on either or both of static parameters associated with physical components of the vehicle or dynamic parameters associated with operation of the vehicle. In this method, the first electromagnetic actuator may include a linear actuator and the second electromagnetic actuator may include a rotary actuator.

Other features and advantages will be apparent from the description and from the claims.

BRIEF DESCRIPTION OF THE DRAWINGS

Like reference numerals in the various figures indicate like elements.

DETAILED DESCRIPTION

Figure 1:
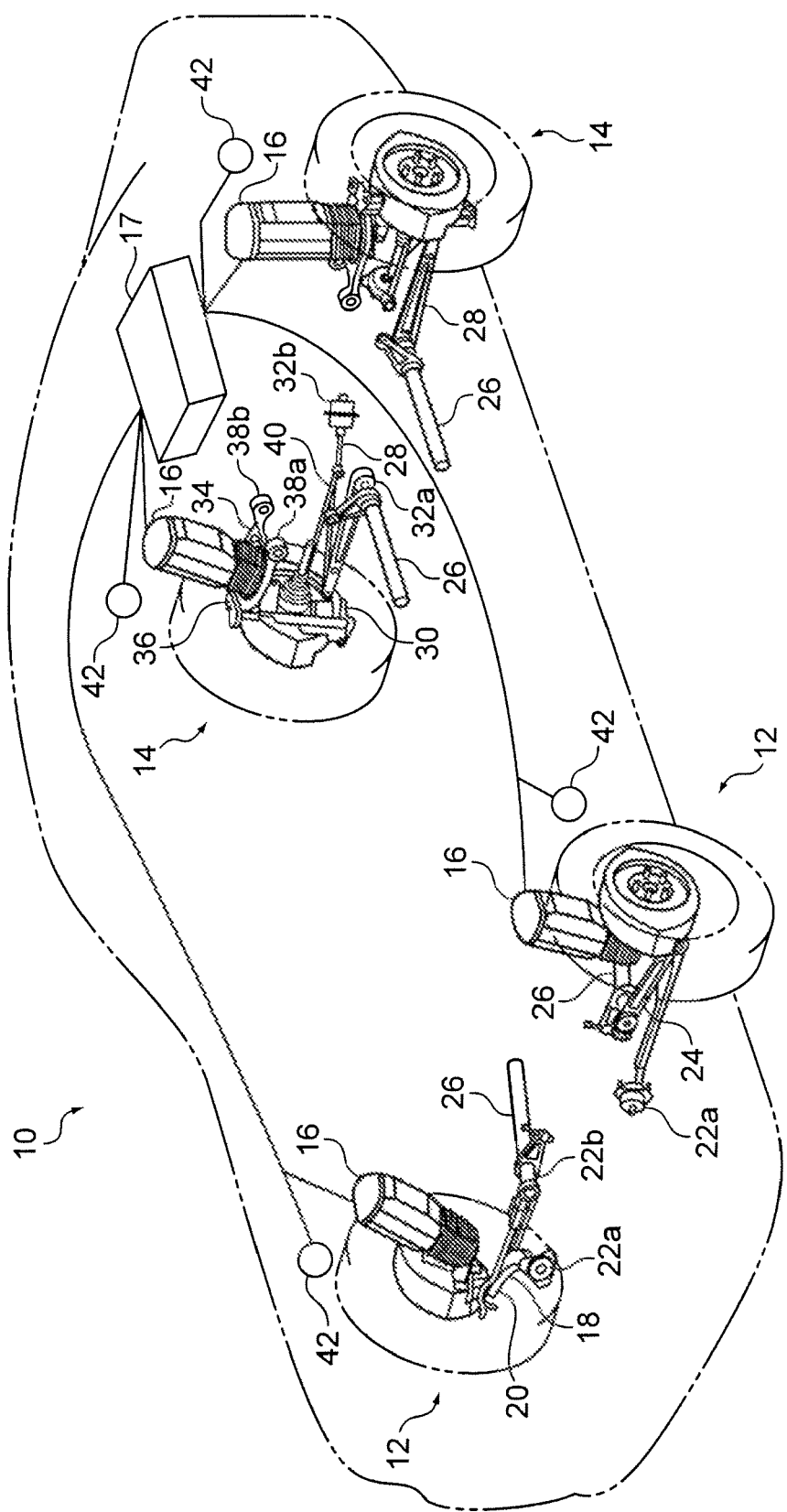
FIG. 1 is a perspective view of an exemplary vehicle including a suspension system.

Referring first to FIG. 1, the suspension of a passenger vehicle includes two independent front wheel suspension assemblies 12 and two independent rear wheel suspension assemblies 14, each including an active suspension unit 16 and a corresponding wheel assembly connected to the body of the vehicle 10. In this illustrated system, the active suspension units 16 in the suspension are generally positioned where one would expect to find a hydraulic damper (e.g., a shock absorber or a strut) in a conventional suspension, although the function of the units 16 is significantly different from that of a hydraulic damper.

In the illustrated embodiments, a control system 17 is coupled to the active suspension units 16. The control system 17 includes circuitry that controls the operation of the active suspension units 16. In some embodiments, the circuitry may be located elsewhere within the vehicle (e.g., in the front of vehicle, within the body of active suspension units 16 themselves, or elsewhere). For example, each active suspension unit 16 may have its own circuitry located inside the unit 16.

The front suspension may be configured to use the active suspension units 16 in a McPherson strut type configuration. Other components of the front suspension 12 may include lower control arms 18 pivotally connected to the front wheel assemblies at lower ball joints 20 and to the suspended body 10 at lower arm bushings 22a and 22b; adjustable tie rods 24 pivotally connected to steering knuckles of the front wheel assemblies and to a connecting steering linkage (not shown); and torsion bar springs 26 connecting the suspended body 10 with the lower control arms. The top caps of actuators 16 typically are pivotally connected to the sprung mass of the vehicle through bushings (not shown). It should be noted that not every component mentioned is visible or shown in FIG. 1 for each wheel assembly. The active suspension units 16 may be connected to the vehicle in various configurations, such as those disclosed in U.S. Pat. No. 4,981,309, U.S. Pat. No. 6,945,541 and EP publication 1790505, published May 30, 2007. The entire contents of the above US patents and patent applications are incorporated herein by reference as if set forth in their entirety.

The components of the rear suspensions 14 may include lower control arms 28 pivotally connected to the rear wheel assemblies at the lower ball joints 30 and to the suspended body 10 at the lower arm bushings 32a and 32b; upper control arms 34 pivotally connected to the rear wheel assemblies at the upper ball joints 36 and to the suspended body 10 at upper arm bushings 38a and 38b; adjustable toe links 40 pivotally connecting the rear wheel assemblies and suspended body 10 for setting static rear toe angles; and torsion bar springs 26. All control arm bushing axes extend generally parallel to the fore-aft centerline of vehicle body 10. It should be noted that spring 26 could also be a coil spring, an air spring, a leaf spring, or any other known type of spring element.

The vehicle may also include one or more sensors 42 for sensing various aspects of the vehicle condition. Conditions of the vehicle such as the motion and/or position of the wheel assemblies (the unsprung masses) and the motion and/or position of the vehicle body (the sprung mass) may be sensed. Vehicle conditions may be sensed using accelerometers, position sensors, velocity sensors, or any other type of motion sensor. Additionally, other conditions of the vehicle or its surrounding environment may be sensed. For example, the vertical profile of the road may be sensed using laser, ultrasonic, radar, or any other known sensing method, the external ambient temperature may be sensed, and the temperature of various suspension components may be sensed, such as the temperature of the actuators 16 and the temperature of the power electronics (i.e. power amplifier 66 of FIG. 2 and any associated power supply components) that supply electrical power to the actuators 16. The sensed information is made available to the control system 17. Sensors 42 can be mounted to one or more of the vehicle body 10, the wheel assembly, the suspension unit 16, the power amplifier 66 or control system 17.

Figure 2:
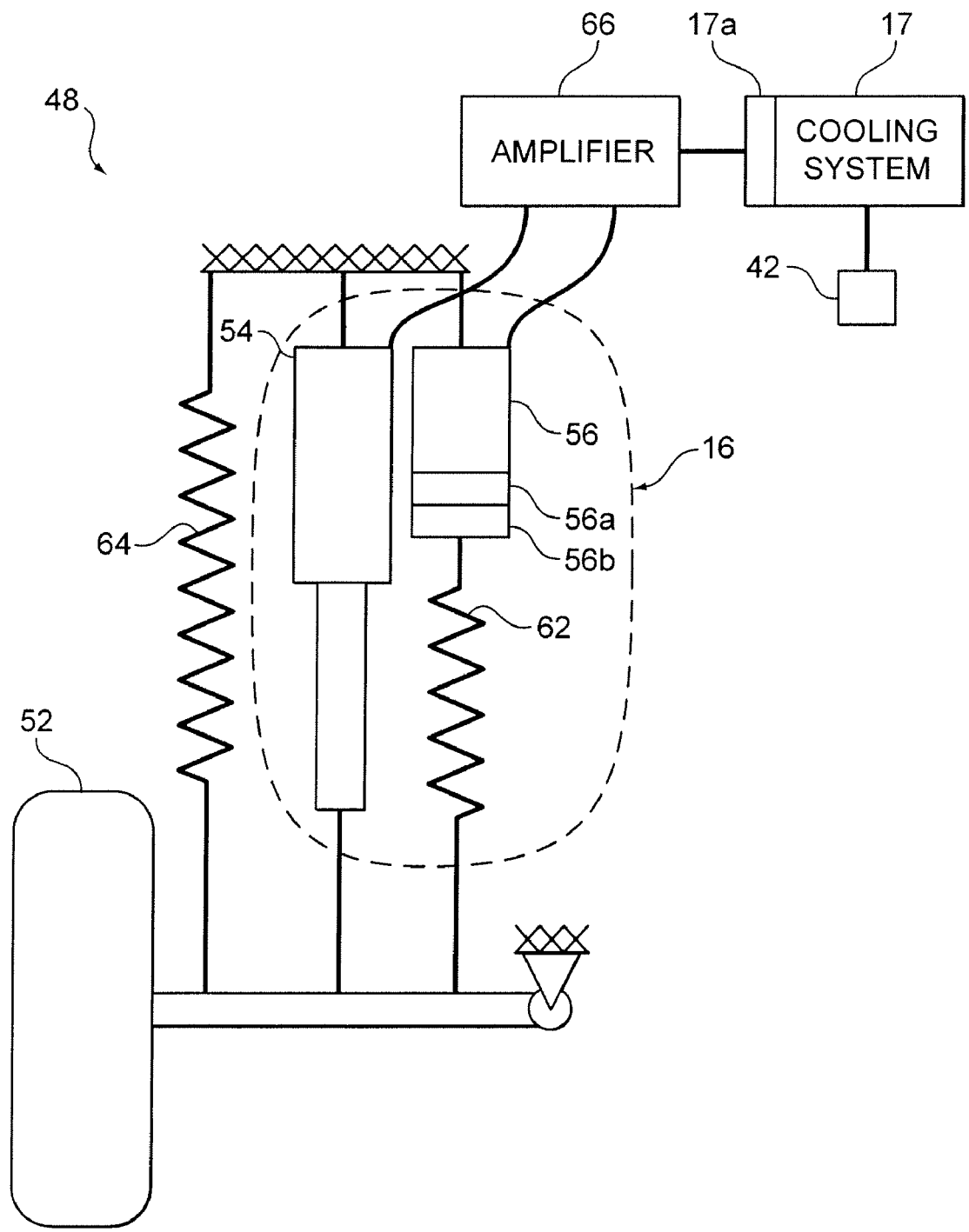
FIGS. 2, 5, 6, and 7 are schematic views of exemplary suspension systems.

FIG. 2 is a schematic view of selected components of an exemplary suspension system 48. The suspension system 48 may represent a front corner suspension assembly (e.g., the assembly 12 of FIG. 1) or a rear corner suspension assembly (e.g., the assembly 14 of FIG. 1). The suspension system 48 includes an active suspension unit 16, control system 17, and wheel assembly 52. For the sake of simplicity, only a schematic representation of a swing axle type suspension linkage is shown. The selected components could be used on other types of suspension linkages not explicitly shown such as a McPherson strut, double A-arm, or even a multi-link independent suspension.

In some embodiments, an active suspension unit 16 may include two or more force and/or position sources which may include linear electromagnetic actuators (i.e. actuator 54) and rotary electromagnetic actuators (i.e. actuator 56). In some embodiments, other types of actuators such as hydraulic and pneumatic actuators may be used in combination with or as replacements for one or both of the linear and rotary electromagnetic actuators. The actuators 54 and 56 may be arranged essentially in parallel to each other (as shown), or they may be operated in series. In some embodiments, a pneumatic or air bag actuator may be used in combination with a linear, a rotary, or a combination of both linear and rotary electromagnetic actuators. For example, the pneumatic actuator may be used to offset large changes in gross vehicle weight, while the linear and/or rotary actuators are used to provide dynamic forces to control vertical displacement, acceleration, etc. of the vehicle body when the vehicle is in motion.

As shown in FIG. 2, active suspension unit 16 is composed of two suspension actuators 54 and 56. Linear electromagnetic actuator 54 and rotary electromagnetic actuator 56 provide active controlled forces between the sprung mass (~ one-quarter of vehicle body 10) and the unsprung mass (wheel assembly 52). The linear electromagnetic actuator 54 can be any suitable form of linear electromagnetic motor, such as the one described in U.S. Pat. No. 4,981,309. The rotary electromagnetic actuator may be any suitable form of rotary electromagnetic actuator, such as an AEROTECH S-130-60 from Aerotech, headquartered at Pittsburgh, Pa. The suspension system 48 also includes spring element 62 positioned between actuator 56 and the unsprung mass 52 and spring element 64 positioned between the sprung mass 10 and the unsprung mass 52. A tire spring (not shown), representing the stiffness of the tire is positioned between the unsprung mass 52 and the road.

As shown schematically in FIG. 2, the top of the actuators 54 and 56 are coupled to the vehicle body 10. The bottom of the actuators may be coupled directly to the wheel assembly 52 (i.e. the unsprung mass), or they may be coupled to one or more other components such as springs (as described below). The actuators may also connect to the wheel assembly or other components through connecting rods or control arms. For example, in the configuration shown in FIG. 2, the rotary actuator 56 is coupled to and acts through spring element 62 to provide force. In particular, the rotary actuator 56 may, by rotating, adjust the force between the vehicle's sprung mass 10 and unsprung mass 52 by adjusting the displacement of the spring element 62, which is connected to the rotary actuator 56 and the wheel assembly 52. The spring element 62 may be a coil spring or a torsion bar spring mounted so that it acts through a rotary joint. If desirable, a speed changing gearbox 56a may also be used in conjunction with the rotary actuator 56. If spring 62 is a coil type spring, a mechanism 56b would be used to convert rotary to linear motion. Mechanism 56b may be a lead screw, a ball screw, a rack & pinion, or other lever mechanism arrangement.

In some configurations, the active suspension system 48 also includes spring element 64, which can be, for example, a torsion bar spring, a coil spring or an air spring. The spring element 64 can be/arranged generally parallel with the spring element 62 (as shown) or in series with it as described in more detail below in conjunction with FIG. 7. The spring element 64 may be employed in conjunction with the actuators 54 and 56. For example, the control system 17 can command both of the actuators 54 and 56 to provide a force that supplements the spring element 64.

The actuators 54 and 56 may receive electrical power from a power source such as a battery, a generator or alternator, a capacitor bank, a power converter for stepping up a voltage, or any other known power delivery device and combinations thereof. In some embodiments, the power source may be located within the control system 17. In some embodiments, the power source may be located separately, elsewhere in the vehicle. In some embodiments, elements of the power source may be distributed throughout the vehicle. For example, portions of the power source may be co-located with the suspension actuators, while other portions may be co-located with the vehicle engine or with control system 17. The control system 17 controls how electrical power is applied to each of the actuators 54 and 56 to cause a force to be generated between the vehicle's sprung/mass and unsprung mass. For example, in one configuration, the control system 17 sends signals to one or more amplifiers 66 that drive actuators 54 and 56. In some embodiments, each actuator is driven by its own amplifier.

In operation, the control system 17 collects data from the sensors 42 and determines the desired force needed to achieve certain system performance based on sensed vehicle conditions. The control system 17 then commands actuators 54 and 56, as appropriate, to provide an active controlled force between the sprung mass of the vehicle (e.g., the body 10) and the unsprung mass of the vehicle (e.g., the wheel assemblies 52). This force may be determined and apportioned among the actuators 54 and 56 based on one or more system parameters, as described in more detail below.

When the actuators 54 and 56 are operated together to provide a force between the sprung mass and the unsprung mass, it may be possible to use smaller, less-expensive, and/or more efficient electromagnetic actuators for one or both of these components than would otherwise be required if a single actuator were used. These smaller actuators may also use less total energy then a single actuator and/or generate less heat than a single actuator. System weight may also be reduced. For example, one actuator can be optimized to efficiently provide high forces that are slowly varying with time and a second actuator can be optimized to efficiently provide lower forces that vary more rapidly with time.

Controller 17 may include a force apportionment system 17a for determining how to apportion forces among a plurality of actuators. The controller 17 first determines what total force is needed between the sprung and unsprung masses in order to control body motion in some desired manner. The controller 17 may calculate this desired total force using any suitable control law. Force apportionment system 17a then determines what portion of the total force is provided by each actuator. There are numerous ways force apportionment system 17a may split forces between multiple actuators. Some of these methods depend on parameters of the physical system and component capabilities, which are generally static with time. For example, one actuator may be capable of outputting large forces only over a limited (i.e. lower) bandwidth, while a second actuator may be capable of outputting smaller forces over a wider bandwidth. An apportionment system taking into account the capabilities of each component divides up the required force by sending separate force commands to each device in a logical manner. In some embodiments, force apportionment system 17a commands the first actuator to provide lower frequency forces, and commands the second actuator to provide higher frequency forces.

Alternatively or additionally, the apportionment system 17a may consider dynamic system parameters related to operation of the vehicle in some manner, in order to determine how to apportion forces. For example, for a low frequency force request from the controller, only the first actuator may receive a command to output a force. At a certain point, however, sensors may determine that the first actuator is outputting its maximum available force. If additional force is still needed, the apportionment system then requests that force be output from the second actuator. In some embodiments, temperature sensors may determine that the first actuator is approaching or exceeding its maximum operating temperature. In this case, force apportionment 17a system may use the temperature information to alter the force command to the first actuator to maintain device temperature within desired limits. Simultaneously, the force apportionment system may alter the force command to the second actuator to command it to output more force, to make up for the reduction in force output from the first actuator.

Other dynamic parameters may also be considered by force apportionment system 17a such as; road conditions, temperatures of various components in the active suspension system (i.e. the power amplifiers, power supplies, controller, or the already mentioned actuators), ambient temperature (the output force available may be derated for operation under extreme ambient temperatures), steering angle sensor inputs, motion of the wheel assemblies, motion of the vehicle body, vehicle speed, and available energy in the power supply for the active suspension system. The force apportionment system 17a may also consider, singly or in combination, parameters such as the instantaneous output power capability of the electrical amplifier driving each actuator, the energy storage capability of the power supplies supplying power to the actuator amplifiers, the maximum instantaneous or continuous force output of the actuators, or the instantaneous velocity of the two actuators.

The force apportionment system 17a may be configured to use one set of parameters in some operating conditions, and automatically switch to a different set of parameters if operating conditions change. For example, the force apportionment system may send low frequency force commands to a first actuator and high frequency force commands to a second actuator under normal operating conditions. The crossover frequency (where the crossover frequency is the frequency below which force commands are primarily sent to the first actuator and above which are primarily sent to the second actuator) used by the apportionment system may be allowed to vary based on operating conditions of the vehicle. For example, the crossover frequency may be changed as a function of the actuator temperatures. The crossover frequency can be altered so as to maintain the operating temperatures of both actuators below a set maximum. In conditions where changing crossover frequency is not sufficient to maintain actuator temperatures below the set maximum, the total force requested from the actuators can be reduced. In another example, the crossover frequency may vary as a function of steering wheel input. For example, when a steering input is detected and the road is relatively smooth, the crossover frequency may momentarily increase until the steering input is no longer present. A prolonged steering input is representative of operating in a sustained turn. Under such a condition, the apportionment system can apportion forces to the actuator best able to provide sustained force output to resist body roll.

In some configurations, a rotary actuator 56 is combined with a linear actuator 54. Rotary actuators, especially if they work through a torque amplification mechanism such as a gearbox 56a and/or a ball screw type mechanism 56b, are well suited to output sustained, quasi-static, forces. In such a system, a force apportionment system 17a may split the total force required instantaneously among the two actuators as a function of frequency, where low frequency force commands are sent to rotary actuator 56 and high frequency force commands are sent to linear actuator 54. This can be accomplished by low pass filtering the total force command supplied by control system 17 and providing the low passed total force command to actuator 56, and simultaneously high pass filtering the total force command supplied by control system 17 and providing the high passed total force command to linear actuator 54. In some embodiments, the pass bands of the filters have a degree of overlap, so that both actuators produce force over a range of frequencies centered around the crossover frequency of the filter pair. In some embodiments, the amount of overlap may be minimal. For most vehicles, the crossover frequency is in the range of 1~3 Hz although embodiments are not limited to using crossover frequencies only within this range. Some embodiments may use crossover frequencies lower or higher in frequency than the range of 1~3 Hz. When desired forces with a frequency less than 1 Hz to 3 Hz are provided by rotary actuator 56, the combined system consumes significantly lower average and instantaneous power than would a system using a single linear actuator in place of the combination of a linear actuator and a rotary actuator, as described.

In some embodiments, the cross over frequency may vary as a function of the steering wheel input, as mentioned previously. When a prolonged turn is detected (by use of the steering wheel input, for example), the crossover frequency may be raised to allow the rotary actuator to provide more of the required sustained force to resist roll.

In some configurations, the pass bands of the filters used to apportion forces by the force apportionment system 17a may have some overlap, where both linear actuator 54 and rotary actuator 56 can receive force commands within the overlap range. In some configurations, the pass bands of the filters used by force apportionment system 17a may have little or minimal overlap; and neither of the actuators 54 or 56 may receive force commands within that particular frequency range, thus allowing only the spring element 64 to provide the force. For example, in some embodiments, the cutoff frequency of the low pass filter may be the same as or higher than the cutoff frequency of the high pass filter. In some embodiments, the cutoff frequency of the low pass filter may be lower than the cutoff frequency of the high pass filter. In some embodiments, the cutoff frequencies of the low and high pass filters are both approximately 1-2 Hz In some embodiments, a third actuator (e.g. a pneumatic actuator) may be used in combination with rotary actuator 56 and linear actuator 54. Force apportionment system 17a may employ additional filters, to further divide force commands among the various actuators. For example, the total force command may be low pass filtered and supplied to the pneumatic actuator. The cutoff frequency for this filter may be anywhere in the range below approx. 0.3 Hz. Force apportionment system 17a further employs a high pass filter with a cutoff approximately the same as the low pass filter for the pneumatic filter, and both high pass filters and low pass filters (thus forming a bandpass filter) the total force command that is now applied to the first actuator (e.g. rotary actuator 56).

In some configurations, force apportionment system 17a may apportion the forces commands to the actuators 54 and 56 based on one or more other parameters besides or in addition to frequency. Other parameters that may be used include, but are not limited to, one or more of the following: vehicle load, sustained cornering, sustained braking, operation on banked curves, and overheating of any system component.

In some configurations, the control system 17 and force apportionment system 17a may be configured to operate the actuators 54 and 56 in a redundant (or fault tolerant) mode. The redundant mode may be entered into automatically In response to a triggering event. A triggering event might be sensing a fault condition of a component of the system (e.g. an amplifier, a control board, a power supply, etc.), sensing that an actuator is stuck in a position, sensing that a component has overheated, determining that a vehicle sensor has failed, or identifying in some way any other condition of the system that might cause the system to operate abnormally. In the redundant operating mode, the control system 17 may select one of the actuators 54 and 56 to primarily provide the entire active force between the sprung mass and the unsprung mass across all frequencies and/or conditions. In some implementations, one of the actuators 54 or 56 is held in reserve and applied if the selected actuator fails to operate correctly. In some implementations, one or both actuators 54 and 56 can act as a passive damper by shorting the actuator's motor leads. For example, the input terminals of one of the actuators can be shorted to cause it to operate as a passive damper, while the second actuator functions to provide body control. The exact configuration of the system when operating in the redundant mode may depend on exactly what fault has been detected. For example, if one amplifier has failed and this fault is detected, the input terminals of the actuator connected to this amplifier may be shorted to provide damping, while the second actuator is operated to provide body control. Other configurations may be desirable depending on the exact nature of the fault detected.

Figure 3:
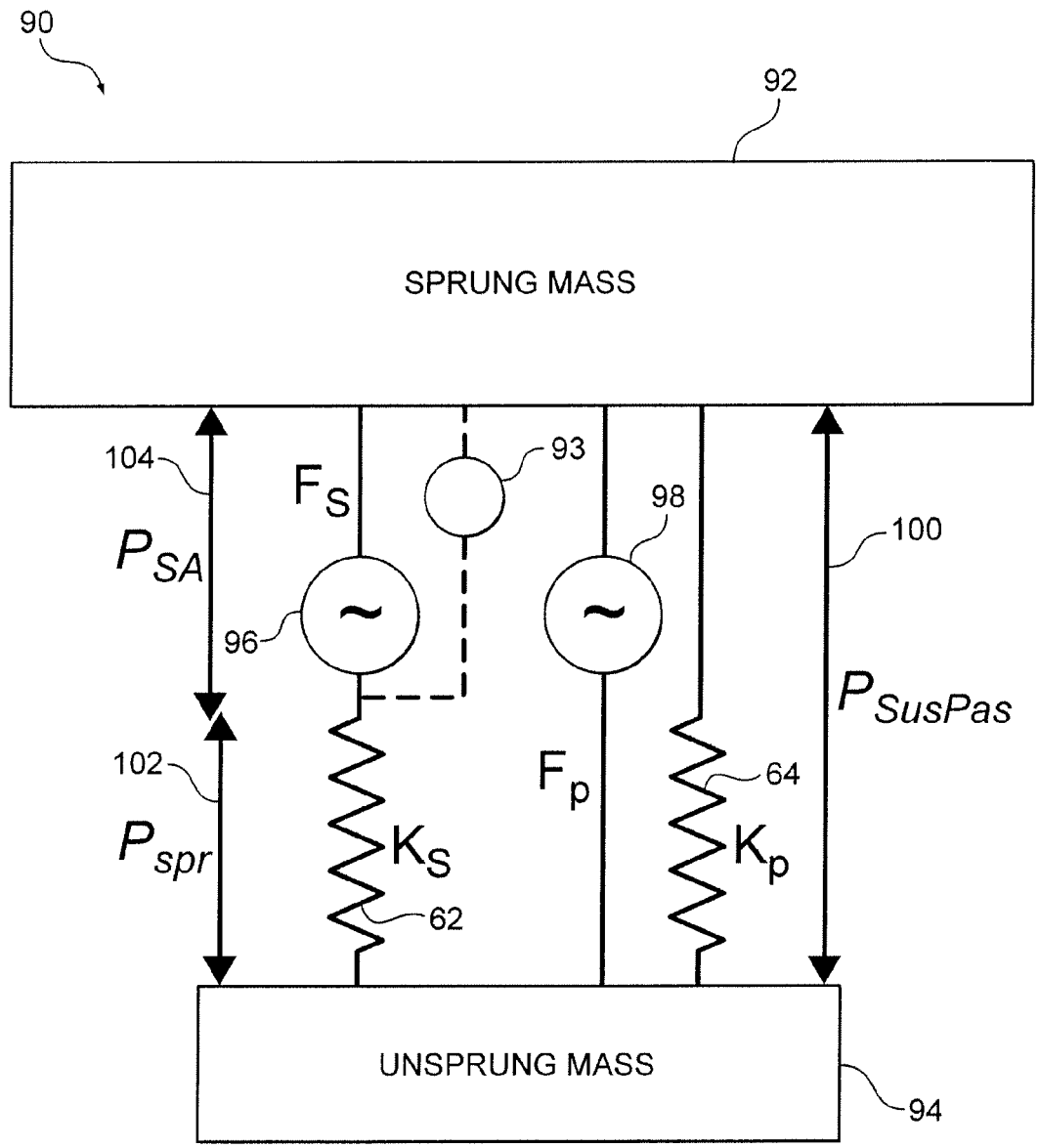
FIG. 3 is a quarter-car diagram of an exemplary suspension system.

FIG. 3 shows a quarter-car diagram 90 of an exemplary suspension system. As shown, the diagram 90 includes a representation 92 of the sprung mass and a representation 94 of the unsprung mass. Between the sprung mass 92 and the unsprung mass 94 is a representation 98 of the force created by the linear actuator 54 (labeled as force $F_p$), and a representation 96 of the force created by the rotary actuator 56 (labeled as force $F_s$). The diagram 90 also includes the spring element 62 with its spring constant Ks and spring element 64 with its spring constant Kp. The diagram 90 also includes a representation 100 (labeled as $P_{SusPos}$) of the displacement (P) between the sprung mass 92 and the unsprung mass 94 (also referred to as the suspension displacement), a representation 102 of the displacement of the spring element 62 (labeled as $P_{spr}$), and a representation 104 (labeled as $P_{SA}$), of the displacement due to the rotary actuator 56.

If we assume for the moment that $P_{SusPos}$ is fixed, and that the rotary motor's linear-to-rotary converter mechanism 56b is centered and spring 62 is in its equilibrium position, if the rotary motor outputs a torque, its displacement will change, and spring 62 will be compressed. For $P_{SusPos}$ fixed, $$P_{SusPos} = P_{SA} + P_{SPR} \text{ and} \quad (1)$$

$$F_{KS} = -K_S * P_{SPR} \quad (2)$$

$F_S(t)$ is determined by the control system 17, which determines $F_T(t)$ (where Ft(t) is defined as the total force desired between the sprung and unsprung mass, and is also equal to the sum: Fs+Fp), and the force apportionment system 17a that splits $F_T(t)$ among the rotary and linear actuators 56 and 54 respectively. Previously, we described a force apportionment system 17a that apportioned forces as a function of frequency, where low frequency force commands were sent to the rotary actuator 56 and high frequency force commands were sent to the linear actuator 54. In this case, $$F_S(t) = LPF(F_T(t)). \quad (3)$$

In another embodiment, the force apportionment system 17a may use a measure of the power efficiency of the various actuators to apportion forces. In some embodiments, the apportionment as a function or relative power efficiency is used in combination with apportioning forces as a function of frequency. However, in some embodiments, force apportionment could be accomplished according to the relative power efficiency of the actuators alone. Apportioning of forces according to relative power efficiency can be done using the following expression:

$$B_S/(B_S + B_P), \text{ where} \quad (4)$$

$B_s$ is the power efficiency of rotary actuator 56 and $B_P$ is the power efficiency of linear actuator 54. Power efficiency is defined as the ratio of force output squared divided by the power input. We can then write the following equation for the rotary motor force command (this command takes into account both frequency and power efficiency of the actuators):

$$F_S(t) = LPF(F_T(t)) * [B_S/(B_S + B_P)]. \quad (5)$$

A similar expression can be written for the force to be applied to the linear actuator 54.

$$F_P(t)=HPF(F_T(t))*[B_P/(B_S+B_P)]. \quad (6)$$

Figure 4:
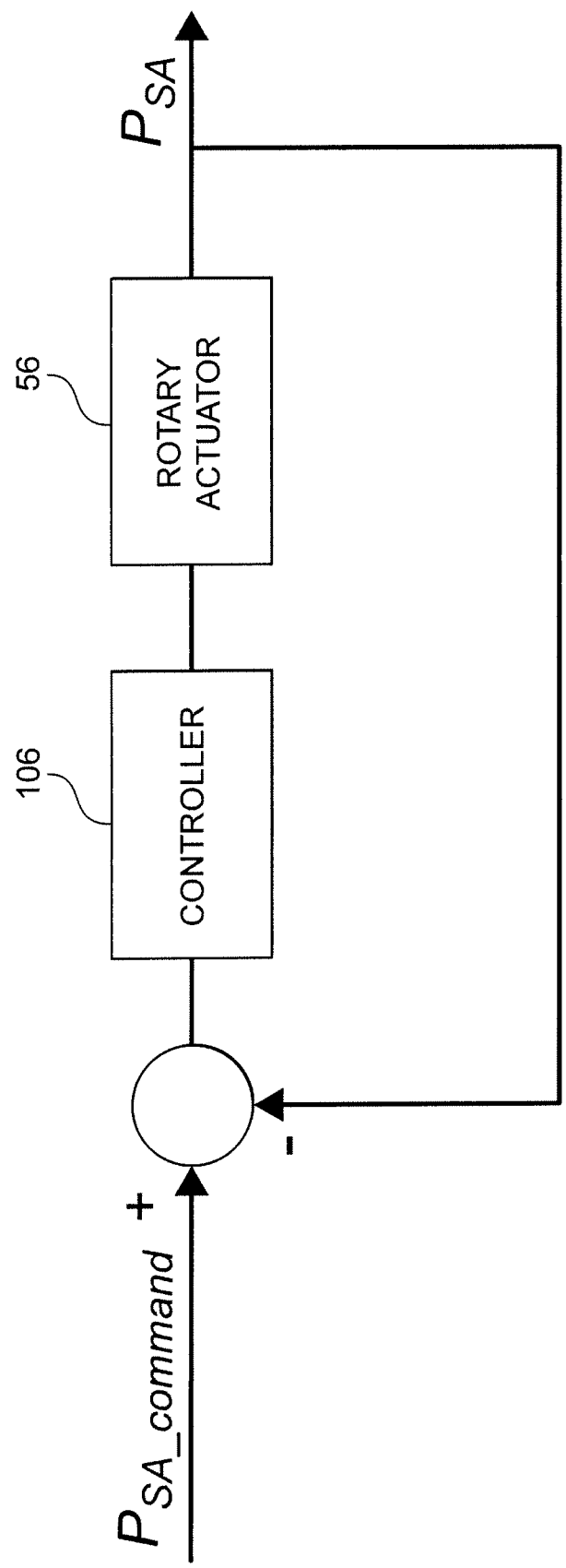
FIG. 4 is a block diagram illustrating the rotary actuator configured to function as a position source.

In some embodiments, it may be desirable use the rotary actuator as a position source, rather than a force source. This can easily be done by using an appropriate position sensor (sensor 93 in FIG. 3), and wrapping a servo loop around the rotary actuator to servo position. (For a rotary motor, position could be sensed by sensing rotation of the motor, or by sensing the displacement of a rotary to linear converter 56b driven by the rotary motor.) The block diagram in FIG. 4 shows further details. As shown, a controller 106, which is coupled to the rotary actuator 56 and position sensor 93 enables the rotary actuator 56 to function as a position source with displacement command $P_{SA\_Command}$ as a reference position command. When rotary actuator 56 is operating as a position source; the effective force output will be equal to the force of Spring Ks.

$$F_S(t)=F_{KS}=-K_S*P_{SPR}. \text{ Furthermore, } P_{SPR} \text{ can be re-written using Eq. 1, to give:} \quad (7)$$

$$F_S(t)=-K_S*(P_{SusPos}-P_{SA}) \quad (8)$$

For embodiments where it is desirable to operate the rotary actuator as a position source, an equation derived from equation 5 for commanding position of the rotary actuator can then be written as follows:

$$P_{SA\_Command}=[[LPF(F_T)/K_S]*[B_S/(B_S+B_P)]]+P_{SusPos} \quad (9)$$

One further enhancement allows the position command of the rotary actuator to track the low passed suspension displacement over time, and is shown in Eq. 10 below. This provides a position command that the rotary actuator can follow and helps in reducing the force expended by the two actuators working against each other, and thus reduces total power consumption in both the actuators (linear and rotary).

$$P_{SA\_Command}=[LPF(F_T)/K_S]*[B_S/(B_S+B_P)]+ LPF(P_{SusPos(t)}) \quad (10)$$

In the exemplary-calculation (embodied in equations 5 and 6), both linear actuator 54 and rotary actuator 56 may be called on to provide forces in the same frequency range (the significant overlap range comprises all frequencies under the cut-off frequency of the low-pass filter). In this frequency range, there is a possibility that the two actuators could be commanded to oppose each other. To help avoid Or mitigate this possibility, a second command (a low frequency position reference input) is used to command the rotary actuator 56 to follow a low pass filtered version of the suspension displacement ($P_{SusPos}$). The effect is that the rotary actuator 56 will supply an effective force of: $F_S=P_{SA\_command}(t)\times K_S$, and the linear actuator 54 will supply a force of: $F_P(t)=F(t)-P_{SA\_command}(t)\times K_S$, where $P_{SA\_Command}$ is as shown in Eq. 10.

Figure 5:
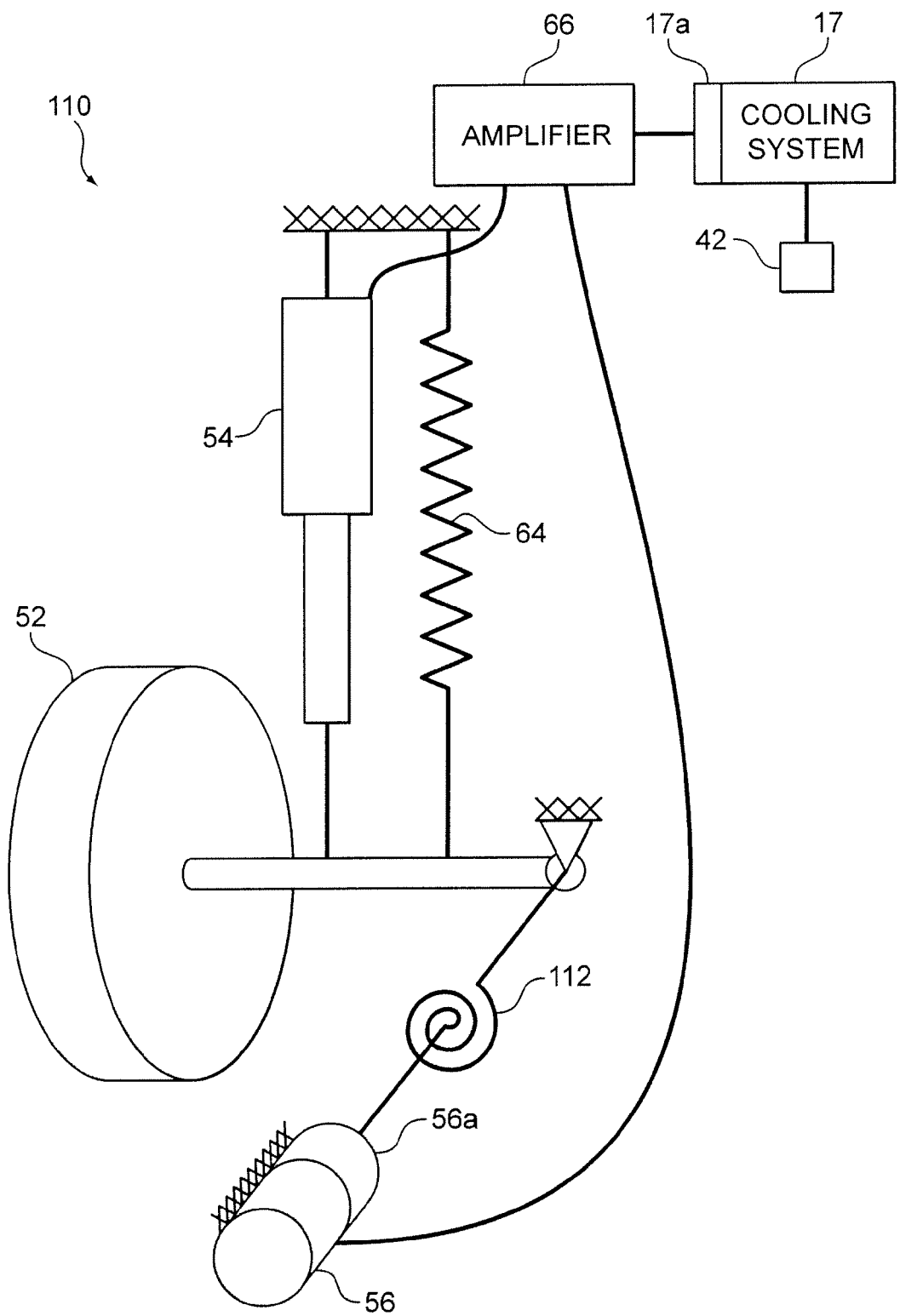
Figure 6:
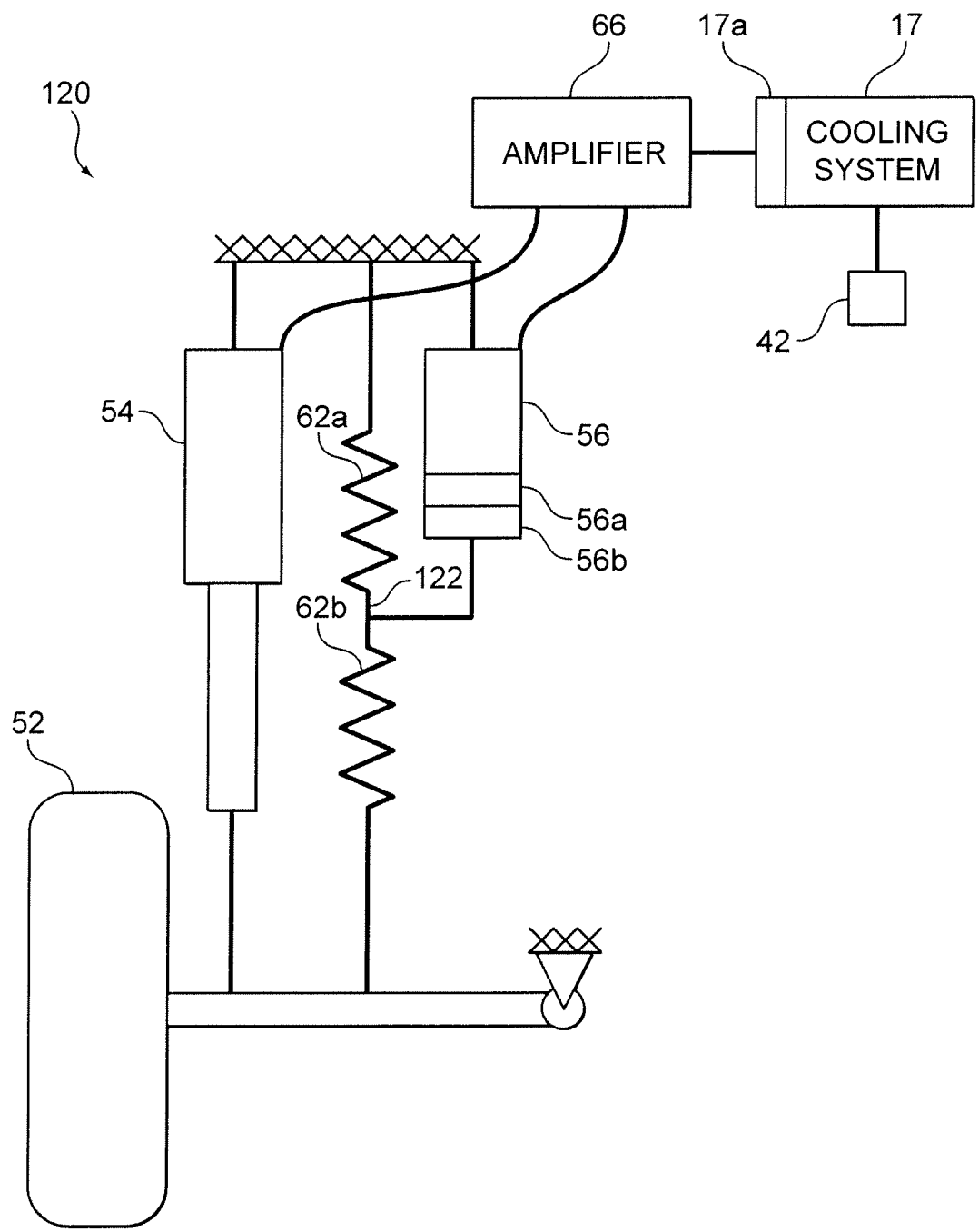
Figure 7:
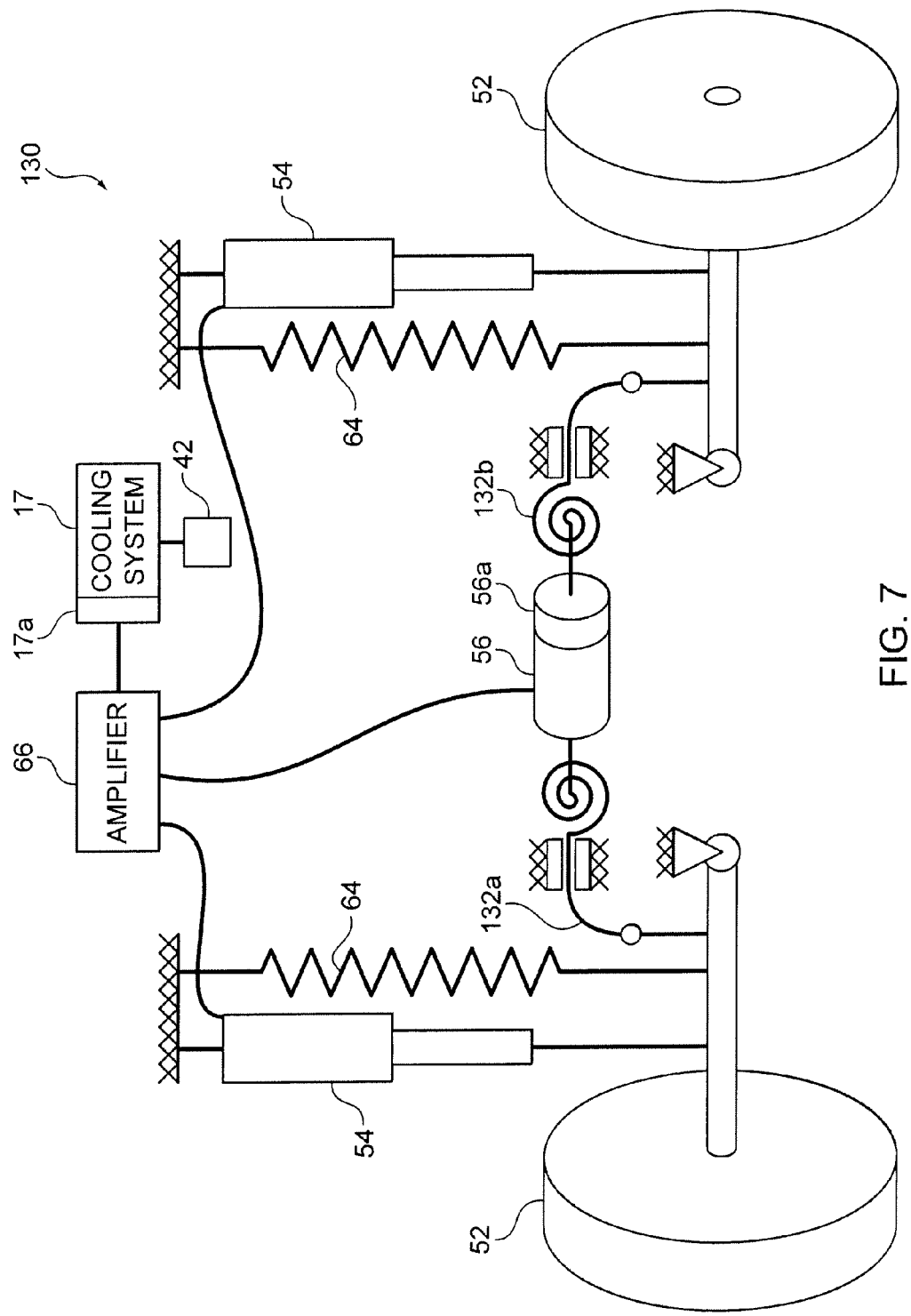

FIGS. 5-7 illustrate several alternative suspension configurations. For example, FIG. 5 shows a suspension system 110 in which the spring element 62 is a torsion bar 112. In this configuration, the rotary actuator 56 twists the torsion bar 112. The torsion bar spring 112 may be connected directly to a suspension link as shown, or it may be connected to the wheel assembly using a lever arm along with an additional tension-compression link as illustrated in FIG. 7. If desirable, a speed changing gearbox 56a may also be used in conjunction with the rotary actuator 56. Torsion bar 112 may be mounted within the vehicle in any suitable position (e.g., longitudinally as shown, laterally, and so forth).

In the configuration illustrated by the suspension system 120 of FIG. 6, the spring element 62 is divided into a first portion 62a and a second portion 62b connected by a common point 122. The rotary actuator 56 is attached to point 122. In this configuration, the rotary actuator 56 increases or decreases the force between the sprung mass and the unsprung mass by providing a force to first portion 62a and/or second portion 62b through point 122. If desirable, a speed changing gearbox 56a may also be used in conjunction with the rotary actuator 56. The spring rates of first portion 62a and second portion 62b can be the same or different. In this configuration, the additional parallel spring element 64 (as shown in FIGS. 2 and 6) has been integrated into the first and second portions of spring 62. The spring element 62 may be a coil spring or a torsion bar spring. For a coil spring, a mechanism to convert rotary to linear motion 56b would be used to couple the rotary actuator 56 to point 122. For a torsion bar spring, the rotary actuator 56, with or without gearbox 56a, could be directly coupled to point 122.

FIG. 7 illustrates a suspension system 130 in which the rotary actuator 56 is coupled between two portions of a stabilizer bar 132a and 132b. In this configuration, the rotary actuator 56 provides a rotational displacement between each portion of the bar in order to create a net torque between the sprung mass and the unsprung mass of the vehicle. The suspension system 130 also illustrates that a single rotary actuator 56 may be coupled to multiple wheels 52 (i.e. to multiple unsprung masses). For example, one rotary actuator 56 that can be connected between both of the front or both of the rear wheels 52 (e.g., mounted between a pair of wheels as shown) provides a torque to resist body roll motions. In some configurations, one rotary actuator 56 may be coupled between a front and rear wheel in order to provide a torque to resist body pitch motions. In some other configurations, a single rotary actuator 56 may be coupled to all four wheels and configured for heave, pitch, or roll control. Other suitable permutations may be used.

Other embodiments are also within the scope of the following claims.

What is claimed is:

1. An apparatus comprising:
   an actuator system comprising a combination of actuators including a linear electromagnetic actuator and a rotary electromagnetic actuator, wherein each actuator of the actuator system provides active controlled force between the sprung mass and a first unsprung mass of a vehicle.

2. The apparatus of claim 1 wherein the rotary electromagnetic actuator is configured as a position source.

3. The apparatus of claim 2 wherein a position command provided to the rotary actuator is a function of the relative power efficiency of the combination of actuators.

4. The apparatus of claim 2 wherein a position command provided to the rotary actuator is a function of a low pass filtered version of the suspension displacement of the vehicle.

5. The apparatus of claim 1 wherein the apparatus further comprises a force apportionment system, for providing force commands to the actuator system.

6. The apparatus of claim 1 wherein the actuator system apportions force commands among the combination of actuators based on a first set of parameters when the vehicle is operating under a first set of operating conditions, and apportions force among the combination of actuators based on a second set of parameters when the vehicle is operating under a second set of operating conditions.

7. The apparatus of claim 1 wherein the actuator system apportions force commands among the combination of actuators as a function of frequency.

8. The apparatus of claim 7 wherein the actuator system provides lower frequency force commands to the rotary actuator, and higher frequency force commands to the linear actuator.

9. The apparatus of claim 7 wherein frequency range of force commands provided to at least two of the combination of actuators have a degree of overlap in frequency.

10. The apparatus of claim 7 wherein the actuator system provides force commands with frequency components below a crossover frequency to a first actuator and force commands with frequency components above a crossover frequency to a second actuator.

11. The apparatus of claim 10 wherein the crossover frequency can vary based on operating conditions of the vehicle.

12. The apparatus of claim 10 wherein the crossover frequency is in the range of 1 to 2 Hz.

13. The apparatus of claim 10 wherein the first actuator is a rotary actuator and the second actuator is a linear actuator.

14. The apparatus of claim 1 configured to apportion force commands among the combination of actuators based on parameters associated with physical components of the system.

15. The apparatus of claim 1 configured to apportion force commands among the actuators based on parameters associated with operation of the vehicle.

16. The apparatus of claim 1 wherein the actuator system further comprises a pneumatic actuator.

17. The apparatus of claim 1 wherein the rotary actuator acts through a spring.

18. The apparatus of claim 17 wherein the spring comprises a torsion spring.

19. The apparatus of claim 17 wherein the spring is divided into two sections and the rotary actuator is connected to a common point between the first and second sections.

20. The apparatus of claim 1 wherein at least one of the combination of actuators is coupled to multiple unsprung masses.

21. The apparatus of claim 20 wherein the at least one actuator comprises a rotary actuator.

22. A method comprising:
apportioning active controlled forces provided between a sprung and a first unsprung mass of a vehicle by first and second electromagnetic actuators based on either or both of static parameters associated with physical components of the vehicle or dynamic parameters associated with operation of the vehicle.

23. The method of claim 22 in which the first electromagnetic actuator comprises a linear actuator and the second electromagnetic actuator comprises a rotary actuator.

* * * * *